US008532620B2

(12) United States Patent
Paya et al.

(10) Patent No.: US 8,532,620 B2
(45) Date of Patent: Sep. 10, 2013

(54) TRUSTED MOBILE DEVICE BASED SECURITY

(75) Inventors: Ismail Cem Paya, New York, NY (US); Marcel Mordechai Moti Yung, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,762

(22) Filed: Sep. 30, 2011

(65) Prior Publication Data
US 2012/0295587 A1 Nov. 22, 2012

Related U.S. Application Data

(60) Provisional application No. 61/487,223, filed on May 17, 2011.

(51) Int. Cl.
*H04M 1/66* (2006.01)
*H04M 1/68* (2006.01)
*H04M 3/16* (2006.01)

(52) U.S. Cl.
USPC ........ 455/411; 455/466; 455/575.8; 455/558; 455/557; 455/432.2; 455/41.1; 455/450; 370/354; 370/338; 370/259; 370/255; 370/352; 370/328; 370/331; 370/408; 370/356

(58) Field of Classification Search
USPC .................. 455/414.1, 411, 466, 575.8, 557, 455/404.1; 370/230, 352, 331, 408, 356, 370/353, 392, 389; 713/100, 183
See application file for complete search history.

(56) References Cited

U.S. PATENT DOCUMENTS

| 2003/0167409 A1* | 9/2003 | Sussman | 713/201 |
|---|---|---|---|
| 2005/0044384 A1* | 2/2005 | Kimura | 713/183 |
| 2007/0143388 A1* | 6/2007 | Futa et al. | 708/492 |
| 2007/0201358 A1* | 8/2007 | Kawamoto et al. | 370/230 |
| 2008/0072277 A1* | 3/2008 | Cohen et al. | 726/1 |
| 2008/0160971 A1* | 7/2008 | Jeon et al. | 455/414.1 |
| 2009/0068982 A1* | 3/2009 | Chen et al. | 455/407 |
| 2009/0203355 A1* | 8/2009 | Clark | 455/411 |
| 2010/0197292 A1* | 8/2010 | Brown et al. | 455/419 |
| 2011/0047369 A1* | 2/2011 | Cohen et al. | 713/100 |
| 2011/0195690 A1* | 8/2011 | Brown et al. | 455/411 |

FOREIGN PATENT DOCUMENTS

| EP | 1 253 500 A1 | 10/2002 |
|---|---|---|
| EP | 1 513 313 A1 | 3/2005 |
| WO | WO 2010/095988 A1 | 8/2010 |

OTHER PUBLICATIONS

Balfanz et al., "Hand-Held Computers Can be Better Smart Cards," Proceedings of the 8$^{th}$ USENIX Security Symposium, Washington, D.C., USA, Aug. 23-26, 1999.
International Search Report issued Jul. 27, 2012 in International Application No. PCT/US2012/038144.
Written Opinion of the International Searching Authority issued Jul. 27, 2012 in International Application No. PCT/US2012/038144.

* cited by examiner

*Primary Examiner* — Joseph Arevalo
(74) *Attorney, Agent, or Firm* — Morris & Kamlay LLP

(57) ABSTRACT

A method for performing user security operations using a mobile communications device includes, storing at least one security credential for a user in the mobile communications device, receiving a request from a client computer to perform an action requiring the stored at least one security credential, wherein the request includes information regarding a service application for which the action is requested, determining a response to the request based upon at least one user configured personal security preference at the mobile communications device, and transmitting the determined response to the client computer. Corresponding system and computer program products are also described.

18 Claims, 7 Drawing Sheets

TRUSTED MOBILE DEVICE BASED SECURITY

CROSS-REFERENCE TO RELATED APPLICATIONS

The present application is a continuation of U.S. Non-Provisional patent application Ser. No. 13/198,388, filed on Aug. 4, 2011, entitled "Trusted Mobile Device Based Security," which claims the benefit of U.S. Provisional patent application Ser. No. 61/487,223, filed on May 17, 2011, both of which are incorporated by reference herein in their entirety.

BACKGROUND

1. Field

This disclosure relates generally to mobile device based security.

2. Background

The ease of accessing is an important consideration in the quality of the user experience associated with on-line applications such as web-based services and other network-based services. In many cases, accessing a service application can include entering a username, password, and one or more other authenticating credentials in order to gain access to that service. For example, a username, password, and a pseudo-random number may be entered in order to access a corporate virtual private network (VPN). The pseudo-random number may be synchronized between the corporate web-site and an electronic key fob carried by the user. In other instances, the user may be required to remember various passwords and other authentication information to access multiple service applications.

As more and more web-based service applications and other network-based service applications are utilized, the demand on the users to remember or otherwise being able to access a multitude of passwords and authentication information for the various service applications may become cumbersome. For example, a user may be required to carry multiple key fobs or be burdened with having to recall the various authentication information that is required to access different services such as banking, corporate VPN, academic sites, subscription sites for news and entertainment, and online shopping sites.

SUMMARY

Methods, systems, and computer program products for user security operations using a mobile communications device are disclosed. An example method for performing user security operations using a mobile communications device includes, storing at least one security credential for a user in the mobile communications device, receiving a request from a client computer to perform an action requiring the stored at least one security credential where the request includes information regarding a service application for which the action is requested, determining a response to the request based upon at least one user configured personal security preference at the mobile communications device, and transmitting the determined response to the client computer.

An example system for user security operations includes a mobile communications device. The mobile communications device includes, a processor, a memory, a communications interface configured to communicatively couple the mobile communications device to at least one client computer, a credential configuration module, a client request receiver, a request validation module, and a client response module. The credential configuration module is configured to store at least one security credential for a user in the memory. The client request receiver is configured to receive, from the client computer, a request for the mobile communications device to perform an action requiring the stored at least one security credential, wherein the request includes information regarding a service application for which the action is requested. The request validation module is configured to determine a response to the request based upon at least one user configured personal security preference at the mobile communications device. The client response transmitter is configured to be executed by the processor and configured to transmitting the determined response to the client computer.

An example computer program product includes a computer readable medium having computer program logic recorded thereon that, when executed by a processor, enables the processor to perform user security operations using a mobile communications device. The computer program logic includes a first logic module, a second logic module, a third logic module, and a fourth logic module. The first logic module is configured to store at least one security credential for a user in the mobile communications device. The second logic module is configured to receive, from a client computer, a request to perform an action requiring the stored at least one security credential, wherein the request includes information regarding a service application for which the action is requested. The third logic module is configured to determine a response to the request based upon at least one user configured personal security preference at the mobile communications device. The fourth logic module is configured to transmit the determined response to the client computer.

Further features and advantages of the implementations, as well as the structure and operation of various implementations thereof, are described in detail below with reference to the accompanying drawings. It is noted that this disclosure is not limited to the specific implementations described herein. Such implementations are presented herein for illustrative purposes only. Additional implementations will be apparent to persons skilled in the relevant art(s) based on the teachings contained in this disclosure.

BRIEF DESCRIPTION OF THE DRAWINGS/FIGURES

Reference will be made to implementations, examples of which may be illustrated in the accompanying figures. These figures are intended to be illustrative, not limiting. Although the invention is generally described in the context of these implementations, it should be understood that it is not intended to limit the scope of the disclosure to these particular implementations.

DETAILED DESCRIPTION

Figure 1:
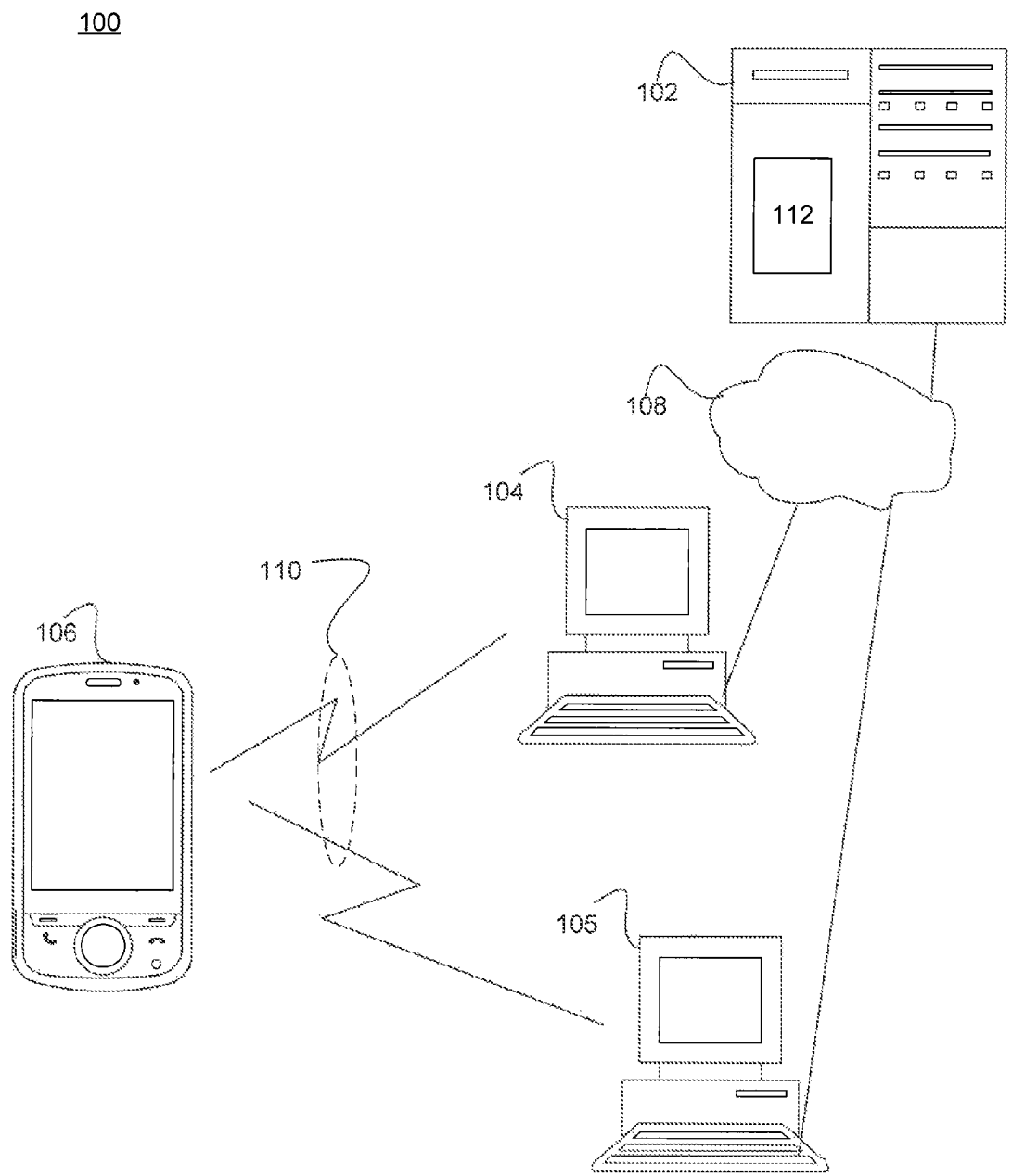
FIG. 1 illustrates a system for mobile communication device based security.

While the disclosure refers to illustrative implementations for particular applications, it should be understood that the disclosure is not limited thereto. Those skilled in the art with access to this disclosure will recognize additional modifications, applications, and implementations within the scope of this disclosure and additional fields in which the disclosed examples could be applied.

Implementations disclosed herein may be used in various applications to perform security-related operations such as authenticating a user, authorizing a user to access a service, activating a transaction on behalf of a user, securely maintaining user security credentials, securely issuing new user credentials based on user's existing credentials, and signing or encrypting/decrypting messages or files using confidential keys. Implementations use a trusted mobile communications device, such as a smartphone, to configure and store keys, certificates, passwords, and other security credentials that are intended to be confidentially maintained by the user. As needed, the stored security credentials, or data elements derived using one or more stored security credentials may be provided by the mobile communications device to client computers. In addition, various security operations involving stored credentials may be performed by the mobile communications device and results may be provided to client computers. In some implementations, the client computers may be untrusted, and therefore the mobile computing device may send to the clients data elements derived based upon the stored credentials, instead of sending the stored credentials.

For web-based service applications, for example, a user may be required to register and/or to login using one or more security credentials. Registering often requires the user to setup an account and associated security credentials for the service application. Logging in often requires the user to provide one or more security credentials to access the service application. Implementations disclosed herein provide a method of authenticating the user to the web service application or other network-accessible services using a mobile communications device that is communicatively coupled to a client computer through which the user accesses the web-based service application. Depending on the type of credential, the level of trust of the client computer and requirements of service applications, credentials may be used differently. For example, although passwords may be sent verbatim to the client computer, a cryptographic hash of a password with a client computer specified (or a server specified) challenge may require HTTP digest authentication. By configuring and maintaining user security credentials in the trusted mobile communications device, and by providing, over a communications interface such as a Bluetooth connection, the credentials to one or more client computers that are configured to access web-based service applications, the ease for the user of maintaining security credentials is improved. In addition, the security of those credentials is improved by, for example, limiting the use of those credentials in untrusted client computers.

Example scenarios in which implementations disclosed herein can be practiced include numerous web or other network-based applications in which a user authentication is required in order to gain access to the service. Virtual private networks, online banking services, online shopping services, online bill paying services, point of sale payment services, cloud computing and storage services, social network applications, and various subscription-based web-accessible services are example service applications. Implementations may also be used in scenarios where a user requires certificates or other security credentials issued by a third party (such as a certificate authority) in order to gain access to a trusted service. Other scenarios in which the implementations can be practiced include situations in which the user is required to sign or encrypt/decrypt a message using security credentials.

FIG. 1 illustrates a system 100 for user authentication using a mobile communications device 106, according to an implementation. System 100 includes a web server 102, one or more client computers 104 and 105, and mobile communications device 106. Web server 102 executes one or more service applications 112, and is communicatively coupled to the client computers 104 and 105 by a network 108. Client computers 104 and 105 are communicatively coupled to mobile communications device 106 over a communications interface 110. Mobile communications device 106 may facilitate security operations for a user to access web-based or other network-based service applications simultaneously through one or more client computers 104 and 105. According to another implementation, some of the communication may occur directly between mobile communications device 106 and service application 112 without being exposed to client computers 104 and 105.

Web server 102 may comprise one or more standalone computers, a server, a server farm, or a cloud-computing server. Client computers 104 and 105 can each comprise a personal computer, laptop computer, notebook computer, tablet computer, set-top box, smartphone, or similar devices that can connect to service applications over a network. Mobile communications device 106 can comprise a smartphone, tablet computer, personal digital assistant, or similar mobile communications devices that can connect to a client computer 104 or 105 using a communication interface 110. Mobile communications device 106 may be a device that is frequently carried by the user. Mobile communications device 106 is a device that the user trusts to be sufficiently secure to hold the user's security credentials. For example, mobile communications device 106 may be a smartphone that is protected by a password in order to prevent access to its data by anyone not authorized by the user. Communications interface 110 can comprise an interface such as Bluetooth, Universal Serial Bus (USB), Wi-Fi, or other interface by which a mobile communications device communicates with a client computer.

Web-based service application 112 can comprise any application that requires a user to authenticate using one or more security credentials or information derived from a security credential in order to access the service. Web-based service application 112 is configured for access by remote users. Network 108 can comprise any network such as the Internet, a wide area network, wireless network, telephone network, or local area network.

Figure 2:
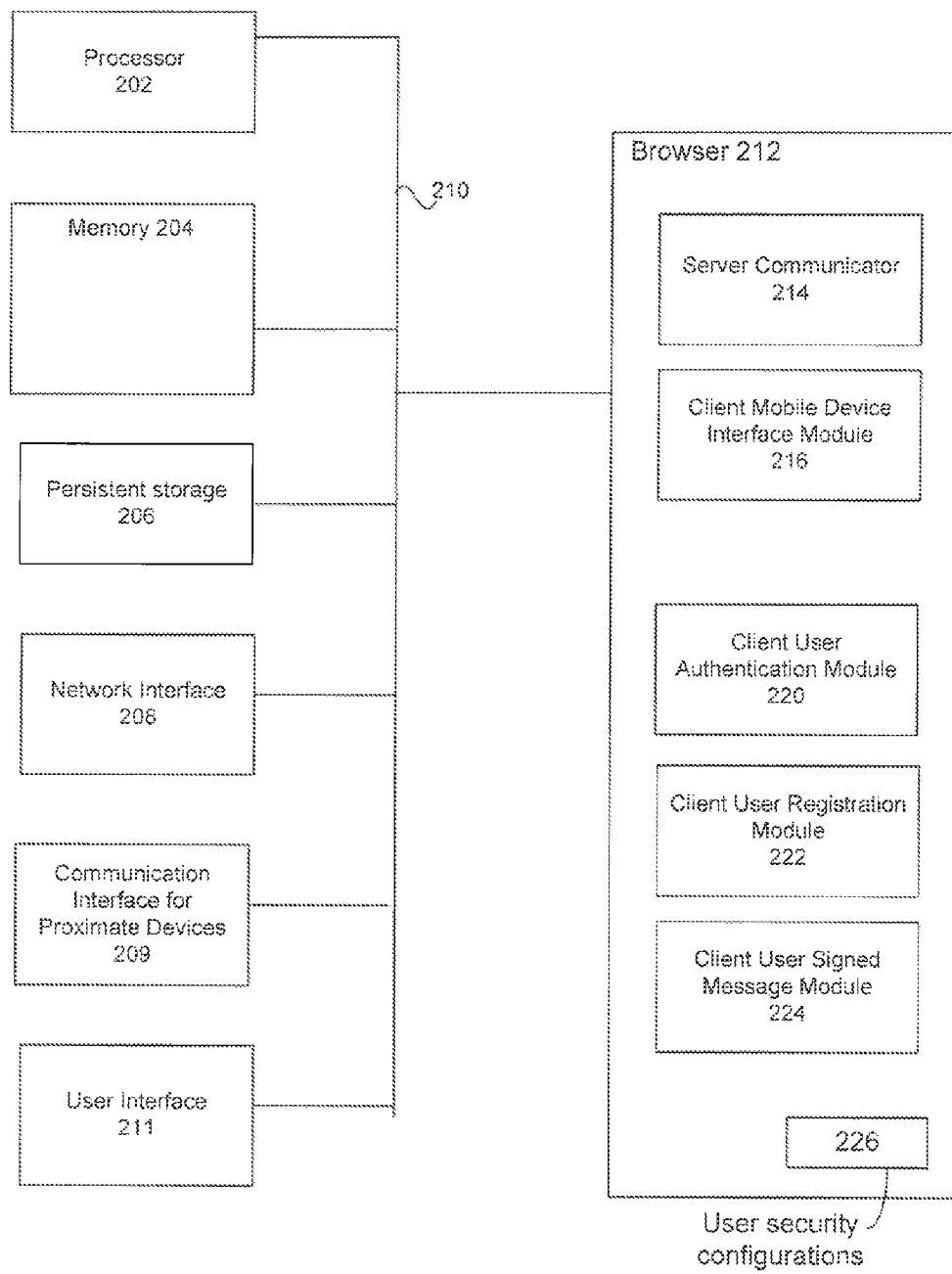
FIG. 2 illustrates a block diagram of a client computer.

FIG. 2 illustrates client computer 104, according to an implementation. Client computer 104 includes a client processor 202, a volatile memory 204, a persistent memory 206, a network interface 208, communications interface for proximate devices 209, an interconnection infrastructure 210, and user interface 211. Client processor 202 can be a processor, such as, but not limited to, a microprocessor, field programmable gate array (FPGA), or digital signal processor (DSP). Volatile memory 204 can include a random access memory (RAM) or like memory. Persistent memory 206 can include a persistent data storage medium such as a hard-disk or flash-memory storage device. Network interface 208 communicatively couples various input/output devices and/or computer networks to computer 104. For example, client computer 104 may be coupled to network 108 through network interface 208. Network interface 208 can comprise one or more interfaces to access wired or wireless networks such as Ethernet network and Wi-Fi networks, and/or one or more interfaces such as USB and Bluetooth to couple proximately located devices.

Client computer 104 may also be communicatively coupled to mobile communication device 106 through communications interface for proximate devices 209. Communications interface 209 can include a technology to interconnect devices allocated close to each other such as USB or other wired interface, or Bluetooth or other wireless interface. Communications interface 209 may implement a middleware to recognize and to communicate with devices that implement various cryptographic services (e.g. encryption/decryption, message signing). For example, communications interface 209 can implement a generic interface that includes interface functions provided by interface specifications such as Public Key Cryptography Standard (PKCS) #11 or Cryptographic Service Provider (CSP). A mobile communications device capable of providing security services can be represented by the middleware of the communications interface 209 in a manner similar to how other devices are identified by device drivers, thereby representing the mobile communications device as a provider of cryptographic operations to the operating system of the client computer 209.

Interconnection infrastructure 210 interconnects modules internal to client computer 104. Interconnection infrastructure 210 can be based on any suitable interconnection mechanism, such as, PCI, USB, Ethernet, Wi-Fi, or like interconnection mechanism. Client computer 104 also includes a browser 212 with which a user can access service application 112 that executes at remote server 102. Browser 104 can comprise any browser used to access web-based service applications, such as service applications 112. Browser 212 may interact with service application 112 using a protocol such as, but not limited to, HyperText Transfer Protocol (HTTP). According to another implementation, browser 212 may interact with service application 112 either automatically, by user interaction, or a combination of both. User interface 211 includes keyboard, mouse, screen and/or other devices through which client computer 104 performs user interactions.

Client computer 104 may further include logic modules such as, server communicator 214, client mobile device interface module 216, client user authentication module 220, client user registration module 222, and client user signed message module 224. Client computer 104 may also include user security configurations 226. According to an implementation, logic modules 214-224 and user security configurations 226 may be implemented in browser 212. User security configurations 226 can include configurations specifying whether user authentication and user security preferences are to be accomplished using a mobile communications device. According to an implementation, user security configurations 226 may be specific to individual users or may be general to all users of the browser. Where user security configurations 226 are configured for individual users, the configurations may be based on cookies or other mechanism by which personalized content is maintained by browsers on a client computer.

Server communicator 214 includes logic for the client computer 104, or browser 212, to communicate with a server, such as server 102, which hosts a service application, such as service application 112. Server communicator 214, for example, may implement one or more protocols such as HTTP to communicate with service application 112.

Client mobile device interface 216 includes logic for client computer 104 to communicate with devices such as a smartphone or other mobile communications device 106 over a communications interface 209. According to an implementation, client mobile device interface 216 determines which communications with the service application 112 require user authentication, signing of a message or other security operation to be performed at mobile communications device 106. Client mobile device interface 216 may implement a protocol defined for client computer 104 and mobile communications device 106 to exchange messages regarding user security operations. For example, the protocol may specify the format and content of the request messages from the client computer to the mobile communications device, and the response messages from the mobile communications device to the client computer.

Client user authentication module 220 includes logic for client computer 104 to communicate with mobile communication device 106, through client mobile device interface module 216, to authenticate the user to a service application 112. For example, the client user authentication module 220 may request and receive security credentials of the user from mobile communications device 106. Such credentials received from mobile communications device 106 (such as a signature on behalf of the user or current user's one time password) can be sent to service application 112 in order to authenticate the user. In other implementations, client user authentication module 220 may temporarily maintain security credentials received from the mobile communications device internally, for example, in a certificate store maintained by the operating system (not shown).

Client user registration module 222 includes logic for the client computer to communicate with mobile communication device 106, through client mobile device interface module 216, to register the user to a service application 112. For example, the client user registration module 222 may request and receive security credentials of the user from mobile communications device 106. Such credentials (such as user's public key certificate) received from mobile communications device 106 can be sent to service application 112 in order to register the user with service application 112.

Client user signed message module 224 includes logic for the client computer to communicate with mobile communication device 106, through client mobile device interface module 216, to cause the user to sign a message at the mobile communications device. For example, the client user signed message module 224 may request and receive a signed message from mobile communications device 106 (for example, client may forward an email message to the device as part of a request, and the device may return a signature of that email message). Such messages signed by the user where the signature or signed message is received from mobile communications device 106 can be then forwarded by client computer 104.

The various logic modules 214-224 can be implemented in software, firmware, hardware, or a combination thereof. In one implementation, modules 214-224 are implemented in the C++ programming language. In one implementation, a computer program product may have logic including the computer program logic of modules 214-224 recorded on a computer readable medium such as a hard disk, flash disk, or other form of storage medium. According to an implementation, modules 214-224 implemented in software execute on processor 202 and utilize volatile memory 204 for temporary storage of data and instructions. Persistent memory 206 may be used for additional temporary storage during the execution of modules 214-224.

Figure 3:
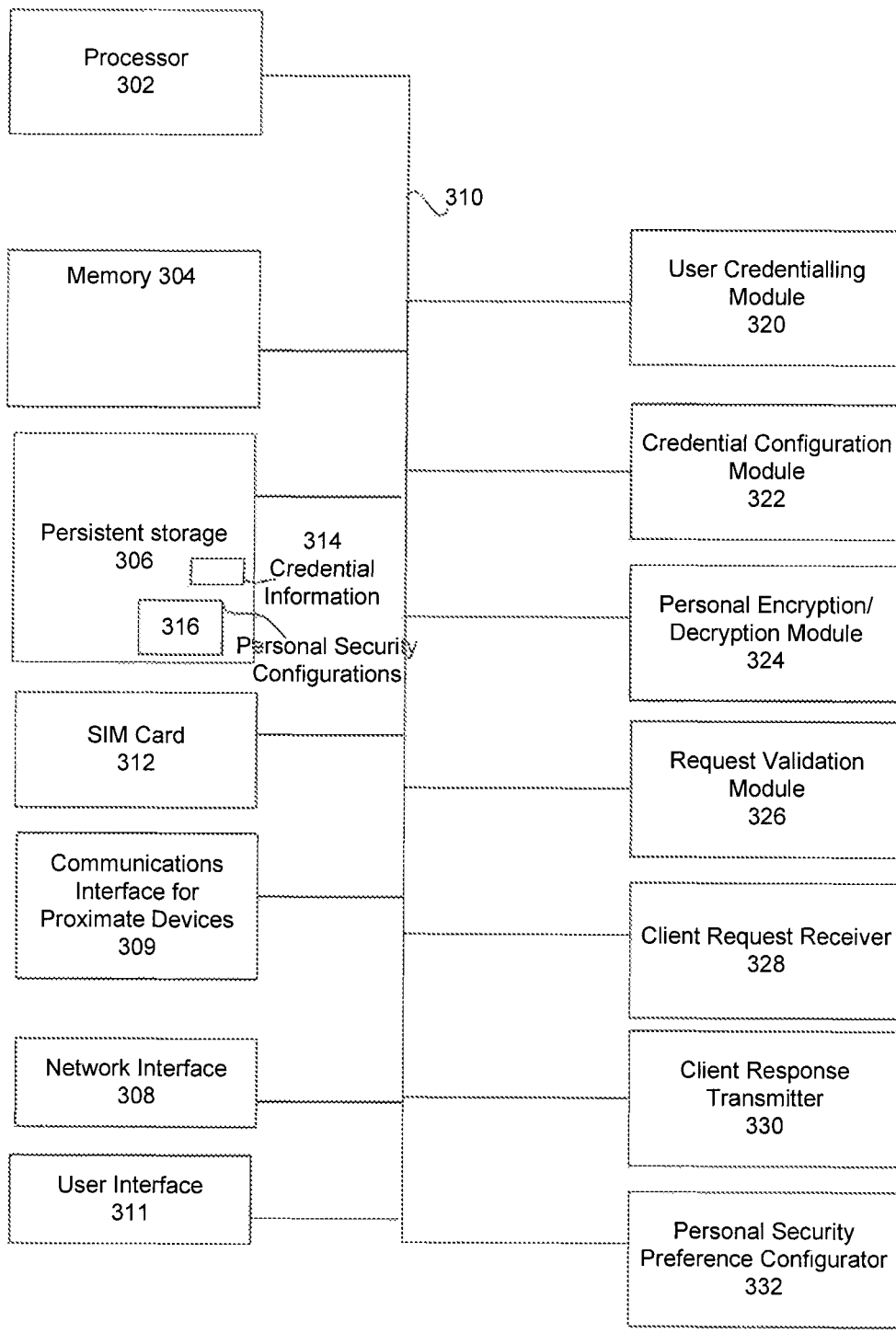
FIG. 3 illustrates a block diagram of a mobile communication device.

FIG. 3 illustrates mobile communications device 106, according to an implementation. Mobile communications device 106 includes a processor 302, a volatile memory 304, a persistent memory 306, a network interface 308, a communications interface to nearby devices 309, and an interconnection infrastructure 310. Processor 302 can be a processor, such as, but not limited to, a microprocessor, field programmable gate array (FPGA), or digital signal processor (DSP). Volatile memory 304 can include a random access memory (RAM) or like memory. Persistent memory 306 can include a persistent data storage medium such as a hard-disk or flash-memory storage device. Network interface 308 interconnects mobile communications device 106 to one or more wired or wireless networks. For example, network interface 308 may provide connectivity to the Internet, a third generation (3G) wireless network, a Wi-Fi network, an Ethernet, a wide area network, or local area network.

Communications interface 309 communicatively couples mobile communications device 106 to a nearby device with a compatible interface (e.g., a device within the communication range of the compatible interface). For example, mobile communications device 106 may be coupled to client computer 104 through communications interface 309. A communications protocol such as USB or Bluetooth can be used over interface 309. Communications interface 309 may further include functionality to present mobile communications device 106 as a security service provider device to client computer 104. For example, communications interface 309 may include middleware that interfaces to client computers and presents the mobile communications device 106 as a device that can provide services such as encryption/decryption, signing of messages, and the like, in a manner that the applications on the client computers require little or no modification. An Interconnection infrastructure 310 interconnects modules internal to client computer 104. Interconnection infrastructure 310 can be based on any suitable interconnection mechanism such as, PCI, USB, Ethernet, WIFI, or like interconnection mechanism. User interface 311 may include a keyboard, a pointing device, a screen, a touchscreen and/or other devices through which mobile communications device 106 performs user interactions.

Mobile communications device 106 may also include a subscriber identity module (SIM) card 312. According to an implementation, SIM card 312 may be used to store user information necessary to access various networks and credential information 314. According to an implementation, SIM card 314 can be any type of tamper-resistant module, or secure element (SE), included in the phone for storing cryptographic keys. Types of SE that may be incorporated in mobile communications device 106 include, but are not limited to, embedded SE that are part of the mobile communication device chipset or an SE that is integrated to a storage card that may or may not be removable.

Further, mobile communications device 106 includes a user credentialing module 320, a credential configuration module 322, a personal encryption/decryption module 324, a request validation module 326, a client request receiver 328, a client request transmitter 330, and a personal security preference configurator 332. User credentialing module 320 includes logic to implement user security operations on mobile communications device 106. For example, user security operations can include providing one or more user security credentials, signing of messages, hashing, computing message authentication codes (MAC) and encryption/decryption of messages. Providing one or more user security credentials may include, for example, providing credentials to register the user to a new service or logging in the user to a service (which may be, for example, the user's public key certificate, or may be a new key and a signature on a certificate by the user's permanent key together with the permanent key certificate signed by an external certification authority). User credentialing module 320 includes the logic to determine the security credential applicable to the received request, and may determine any user security preferences applicable to the request before determining the appropriate response to be sent to the client computer.

Credential configuration module 322 includes logic to configure a user's personal security credentials in mobile communications device 106. According to an implementation one or more passwords, a private key, a public key, one or more certificates from a certificate authority, or other security credential may be configured using credential configuration module 322 as credential information 314. New credentials may be configured locally or could be received from an entity such as a certificate authority or other computer. Local configuration of credentials can include, for example, user input of passwords, copying a credentials file onto the device, and by generating one or more keys locally. Credentials may also be preconfigured at the time of manufacture or service provisioning. Credential information 314 may be stored in persistent storage 306 and/or in SIM card 312. Credential information 314 may include, but is not limited to, cryptographic public and symmetric keys for operations such as hashing, computing message authentication codes, signing and encryption, decryption, pseudorandom derivation, cryptographic certificates, secret strings for ability to answer certain questions and other secret values.

Personal encryption/decryption module 324 includes logic to perform encryption and decryption of messages on mobile communications device 106 using user's keys that are maintained in mobile communications device 106, such as a user's private key included in credential information 314. The personal encryption/decryption module 324 may also be configured for other cryptographic functions, such as, pseudo-random number generation, cryptographic hashing and computing message authentication codes.

Request validation module 326 includes logic to determine if a request, such as a request for authentication of a user, received from a client computer is a valid request. For example, a received request may be checked against a list of personal security configurations 316. Personal security configurations 316 may include a list of web-based servers to which the user's preference is not to authenticate, and/or one or more web-servers to which the user's preference is to authenticate. Personal security configurations 316 may also include one or more rules specifying security related actions to be taken by mobile communications device 106 upon a request being received from a client computer. Checking cryptographic integrity of a request may also be performed.

Client request receiver 328 and client request transmitter 330 include logic to communicate with one or more client computers over, for example, communications interface 309. According to an implementation, client request receiver 328 and client request transmitter 330 implement a protocol through which the mobile communications device 106 and client computer 104 or 105 can exchange messages that are required to achieve the user's secure operations functionality. According to an implementation, mobile communications device 106 may communicate over a plurality of client computers, such as computers 104 and 105, over the same or different types of communications links. For example, computers 104 and 105 may communicate with mobile communications device 106 using any combination of a Bluetooth link, USB or Near Field Communications link.

Personal security preference configurator 332 includes logic to configure personal security configurations 316. Personal security configurations 316 can include web sites to which it is considered safe to be authenticated, web sites to which the user should not be authenticated, or one or more rules to be used in processing requests for security operations. Rules may also include information as to what types of authentication requests or other requests for security operations can be automatically authorized without prompting the user and/or receiving specific authorization. The type of request may be identified based on any information determinable from the request, such as, for example, client computer identity or client computer domain, service application or service application domain, and/or requested security operation. Specific rules may be set up, for example, to automatically authorize security operations requests from the user's personal laptop to one or more domains of service applications. Personal security configurations including rules may be pre-configured or may be configured per request by user input.

The various logic modules 320-332 can be implemented in software, firmware, hardware, or a combination thereof. In one implementation, modules 320-332 are implemented in the C++ programming language. In one implementation, a computer program product may have logic including the computer program logic of modules 320-332 recorded on a computer readable medium such as a hard disk, flash disk, or other form of storage. According to an implementation, modules 320-332 implemented in software execute on processor 302 and utilize volatile memory 304 for temporary storage of data and instructions. Persistent memory 306 may be used for additional temporary storage during the execution of modules 320-332.

Method for User Authentication Using Mobile Communications Device

Figure 4:
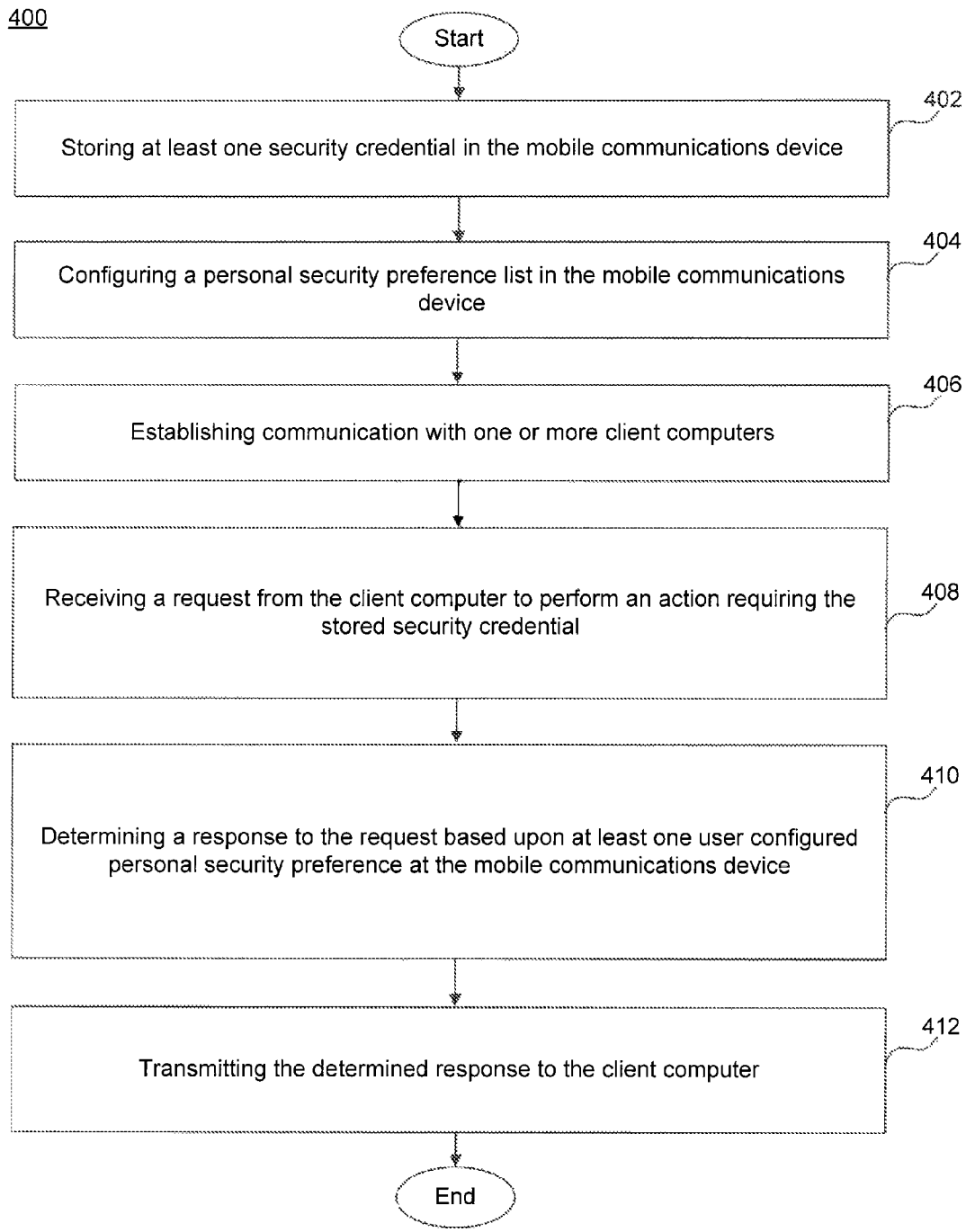
FIG. 4 illustrates a flowchart of a process for performing user security operations using a mobile communications device.

FIG. 4 illustrates a method 400 for user authentication using a mobile communications device, according to an implementation. Method 400 can be practiced, for example, in system 100 shown in FIG. 1. Specifically, method 400 can be implemented in mobile communications device 106 using, for example, modules 320-332.

In step 402, at least one security credential is stored in a mobile communications device. According to an implementation, a private key for the user and a certificate from a certification authority (CA), each generated as part of a public key infrastructure (PKI), may be stored on a mobile communications device. For the convenience of distributing to entities that require it, the public key of the user may also be stored in the mobile communications device. According to another implementation, one or more passwords can be configured. According to yet another implementation, a token generator can be initialized where the token generator is configured to generate a token that varies with time. The token can be provided, for example, as part of an authentication challenge/response security credential. For example, such tokens may be utilized in accessing corporate VPN networks. Furthermore, other security credentials such as responses to security questions asked by many web service applications may be stored in the mobile communications device.

According to an implementation, the personal security credentials of the user may be stored in mobile communications device 106 in its persistent memory 306. According to another implementation, for enhanced security, some or all of the security credentials 314 may be stored in SIM card 312 or other SE which is resistant to tampering. For example, mobile communications device 106 may include a special temper resistant memory (e.g. SE or SIM card 312) in which a secret key or seed for generating a one-time-password (OTP) is stored as a security credential 314. An OTP may be generated using the seed and other information to be unique to the mobile communications device 106 and may be used in implementations as a personal security credential of the user. An OTP is typically used for a single login.

In step 404, according to an implementation, a personal security configuration list, such as personal security configuration list 316, is configured. The personal security configuration list can include one or more web sites or web service applications, specified, for example, using the web address or uniform resource locator (URL), for which authentication is undesirable. For example, the user may identify some web sites as potential security risks and may want to be reminded of the risks when requested to provide authentication to access those web sites. Some web sites or web service applications may be identified as not posing a security threat. For example, the user may identify the web service applications visited most frequently as web sites for which authentication should be allowed. According to an implementation, the personal security configuration list can also include one or more rules. Such rules may be processed in responding to a request from the client computer. For example, rules may be configured specifying respective passwords to be provided for each of several web service applications. Rules may be provided specifying the type of security credential required by the various requesting web service applications. For example, rules may be configured specifying the web sites or web service applications that require the response from a token number generator. Rules may also specify a scope for some of the credentials. For example, an OTP may only be sent to the service that issued the seed key, but digital certificates may be open-ended and they may be used safely to authenticate to any endpoint. The configuration of the personal security configurations list can occur at the time of initialization and startup of the mobile communications device, as well as dynamically at any time during the operation of the mobile communications device. Alternatively, certificates of valid web sites may be embedded and a request may be signed and verified before producing responses.

In step 406, the mobile communications device establishes communications connectivity with one or more client computers. For example, mobile communications device 106 may establish communications over interface 110 with client computers 104 and 105. According to an implementation, interface 110 may be a Bluetooth interface that enables the mobile communications device 106 to establish communications with Bluetooth-enabled client computers 104 and 105 when within proximity. By simultaneously associating itself with two more client computers, mobile device 106 can simultaneously support security operations for the user to access web services through client computers 104 and 105. According to an implementation, establishing communications connectivity may include mutual authentication between the client computer and mobile communications device. Such authentication may be required to prevent eavesdropping or masquerading by unauthorized devices. The authentication between mobile communications device and client computer may be based on a link layer authentication and encryption protocol.

In step 408, a request is received from a client computer for the mobile computing device to perform a user security operation, according to an implementation. For example, a request for a security operation involving one or more of the security credentials available at the mobile communications device 106 may be received from client computer 104 over Bluetooth interface 110. Client request receiver module 328 may receive the request through communications interface 308.

According to an implementation, the request may be formatted according to a predetermined protocol for exchanging security operations related messages. The protocol may define one or more types of request messages from the client computer to the mobile communications device, and one or more types of response messages from the mobile communications device to the client computer. Types of request messages may include, but are not limited to, request for registration security credentials, request for login security credentials, request for message encryption, request for message signing, and requests for types of available credentials. Each type of request message may further identify a sub-type, such as whether what is requested is a password, a key, a response to a security query, a challenge response, and the like. The request message may include sufficient information to enable the user to make an informed decision on whether to perform the requested security operation. For example, a request to sign an email message may include the entire email message, so that the message can be displayed on the screen of the mobile communications device for the user. A request for a password may include information identifying the service application and the server on which the application is executing.

The request from the client computer to the mobile communications device to perform an action requiring one or more of the security credentials stored or otherwise available at the mobile communications device is received by, for example, the client request receiver module 328.

In step 410, a response is determined for the request received in step 408. The response may be based upon one or more of the personal security preferences configured in the mobile communications device. According to an implementation, the response to be sent to client device 104 is determined based upon processing including the configurations in the personal security configurations 316. According to an implementation, the client request receiver module 328 may, upon processing the received request to determine the type of message, use client request validation module 326 to further process the request and one or more of user credentialing module 320 and personal encryption/decryption module 324 to process the request and to generate a response to be returned to the client computer.

In determining the response to the request, the user may be visually prompted and/or prompted by other means to obtain authorization to proceed with the response. Information available from the personal security preferences may be used in facilitating the user's input regarding authorization. For example, if the web site for which the request seeks authentication is listed in the personal security preferences list as a potential risk site, then the user may be informed of the risks associated with the access and allowed to select whether or not to provide authorization.

Based upon the type of request, the user's security preferences, and user authorization, the response to the request is formed. For example, if the request is for a password, a response message is formed indicating the type of message and the password. If the request is for a signed message, a digest of the message is signed using a key available in the mobile communications device and the signed digest is attached to the response. If the request is for a challenge/response value, such a value is determined and is attached to the response. Likewise, when authorized by the user, the appropriate response to the request is formed. If authorization is not provided by the user, then an error message may be returned to the requestor.

In step 412, the response is transmitted to the client computer. According to an implementation, the response is transmitted by client response transmitter module 330 using communication interface 309. The response may be transmitted over Bluetooth interface 110 to client computer 104 which initiated the corresponding request. As described above, the response may be formatted according to a protocol defining the exchange of messages related to user security operations between a client computer and the mobile communications device. The transmission may be sent until acknowledgement is received from computers 104 105. In addition, the mobile device 106 may keep a record of the action and communication performed in an audit file.

Figure 5:
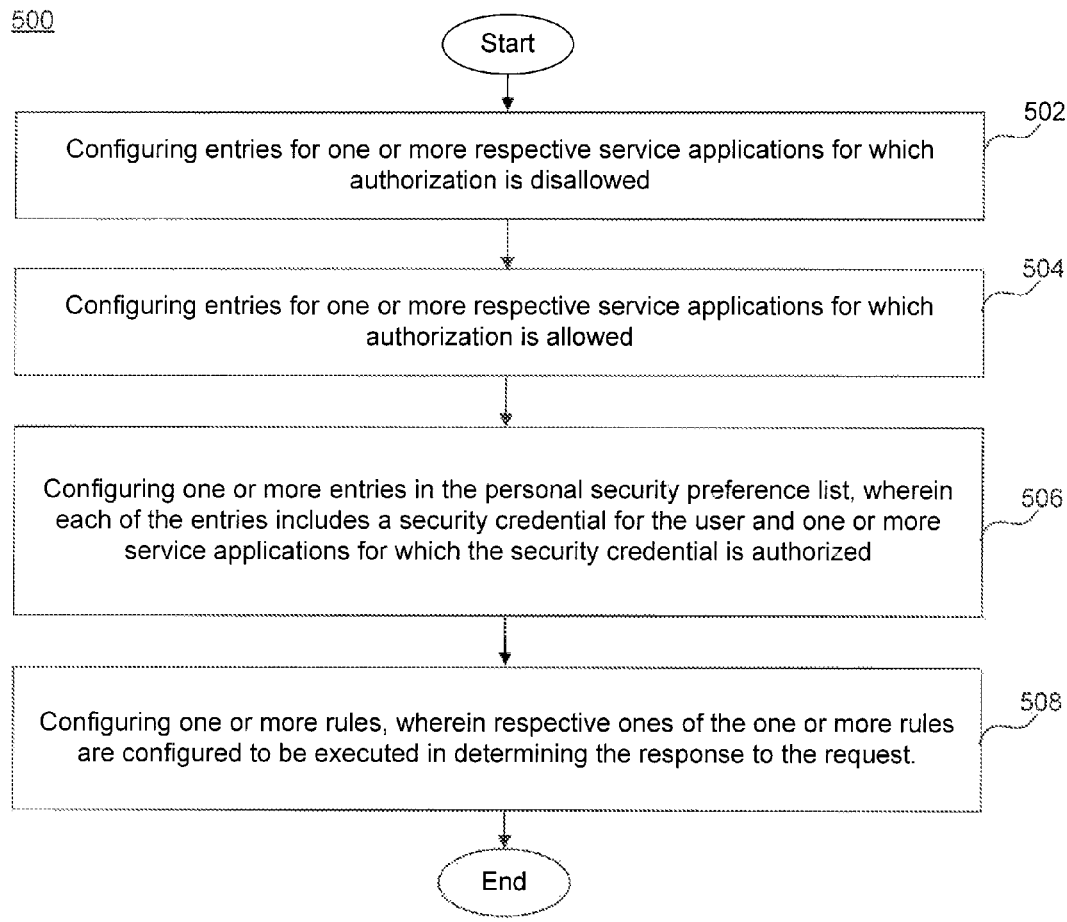
FIG. 5 illustrates a flowchart of a process for configuring user security preferences on a mobile communications device.

FIG. 5 illustrates a method 500 for configuring the user's security preference configurations list in the mobile communications device 106, according to an implementation. Method 500 may, for example, be implemented in performing step 404 described above. According to an implementation, method 500 may be used to configure rows in a table representing the user's security preferences 316, which is stored in persistent memory 306.

In step 502, one or more entries are configured in the list of security preference configurations representing web sites and/or web service applications for which authentication are not desirable. These may be configured by the user, or may be configured automatically by the system. The user may for example add those on-line shopping web sites that the user identifies as potentially fraudulent or hosting malware. Such web sites may also be added to the list based upon information available to the mobile computing device, such as information distributed by firewall or virus detection software identifying web sites that could potentially host malware. The configuration or parts thereof may be downloaded from trusted web sites.

In step 504, one or more entries are configured in the list of security preference configurations representing web sites and/or web service applications for which authentication is verified to be safe. These entries may be added by the user, for example, upon determining that the web sites are safe for use, or when the user specifically indicates that a password or other credential input by him is to be remembered by the mobile communications device. The user may be prompted to indicate or confirm the user's intention as to storing the credentials. These entries may also be added automatically based on information available to the mobile communications device.

In step 506, one or more entries are configured in the list of security preference configurations representing respective user security credentials and web sites and/or web service applications for which they can be used. For example, a password may be configured that is only used to authenticate the user to various web sites in a corporate domain.

In step 508, one or more entries are configured in the list of security preference configurations representing rules to be invoked in processing requests pertaining to identified web sites or web service applications. For example, the rules may specify the type of encryption/decryption to be used. Rules may also specify how challenge/response values are to be computed. According to some implementations, one or more rules may be defined specifying the handling of requests received from particular client computers. For example, client computers in a particular domain may pose a high level of danger, and rules may specify that passwords are not sent in unencrypted form to such client computers. Other rules may specify what types of requests are to be responded from particular web servers or web service applications, or the types of requests and responses that can be exchanged with particular client computers (for example, specified individually or by domain). A rule may also specify that certain web sites or service applications are to be accessed only by the mobile device 106 and not through client computer 104.

Figure 6:
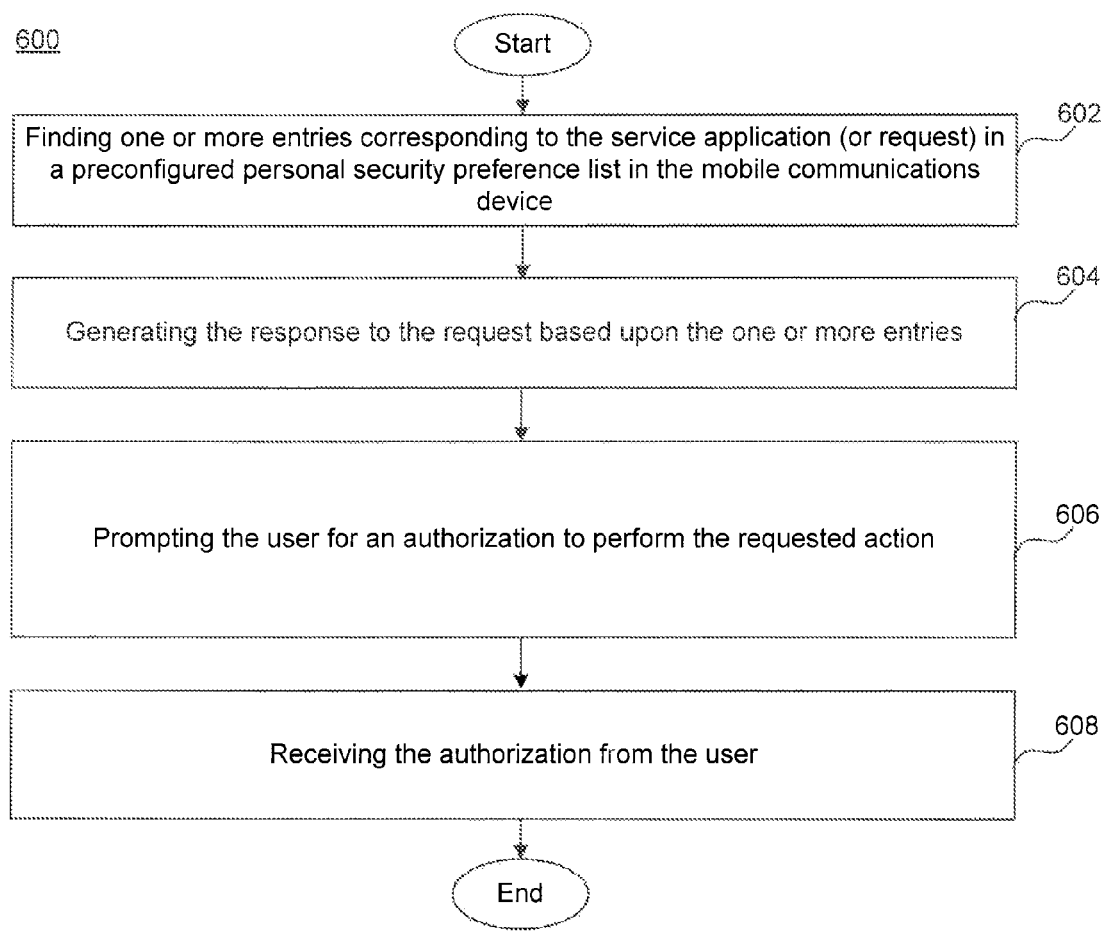
FIG. 6 illustrates a flowchart of a process for determining a response from the mobile communications device.

FIG. 6 illustrates a process 600 for determining the response from the mobile communications device to a request received from a client computer. According to an implementation, process 600 may be implemented in performing step 410 of process 400 described above. For example, mobile communications device 106 may implement process 600 to generate a response to a request received from client computer 104.

In step 602, one or more entries in the user's security preference configurations list that correspond to the received request are identified. The entry may be found to correspond based upon one or more of, the web server to which the request pertains, the web service application to which the request pertains, the type of request, or the client computer sending the request.

In step 604, an initial response is generated based upon the request and the identified one or more entries in the user's security preference configurations. For example, if the request is for a password and the user's security preference configurations list does not include an entry disallowing authenticating the web site or web service application for which the authentication is intended, then an initial response is created to send the requested password to the requesting client computer. Note that, in some implementations, the response generation may be subject to one or more rules from the preference configurations.

In step 606, the user is prompted for authorization to perform the requested action. The user may be prompted by visually displaying a message on the screen of the mobile communications device. Alternatively, or in combination with the visual prompt, the user may be prompted using audio or haptic feedback. According to an implementation, the user is presented with sufficient information to make a well informed decision as to whether to authorize the requested security operation. For example, where a password is requested the message displayed to the user would indicate the web server, web service application, and the client computer associated with the request. In the event that a message signing is requested for an email message, the visual prompt would include, for example, the email message and the email header information, so that the user can be informed as to the content of what is being signed.

In step 608, the authorization to proceed with the requested security operation is received from the user. According to an implementation, the user authorization may be received from the user based on the user selecting a confirmation option on the screen. Other forms receiving the user's input are possible, such as voice input, and are contemplated within implementations.

Figure 7:
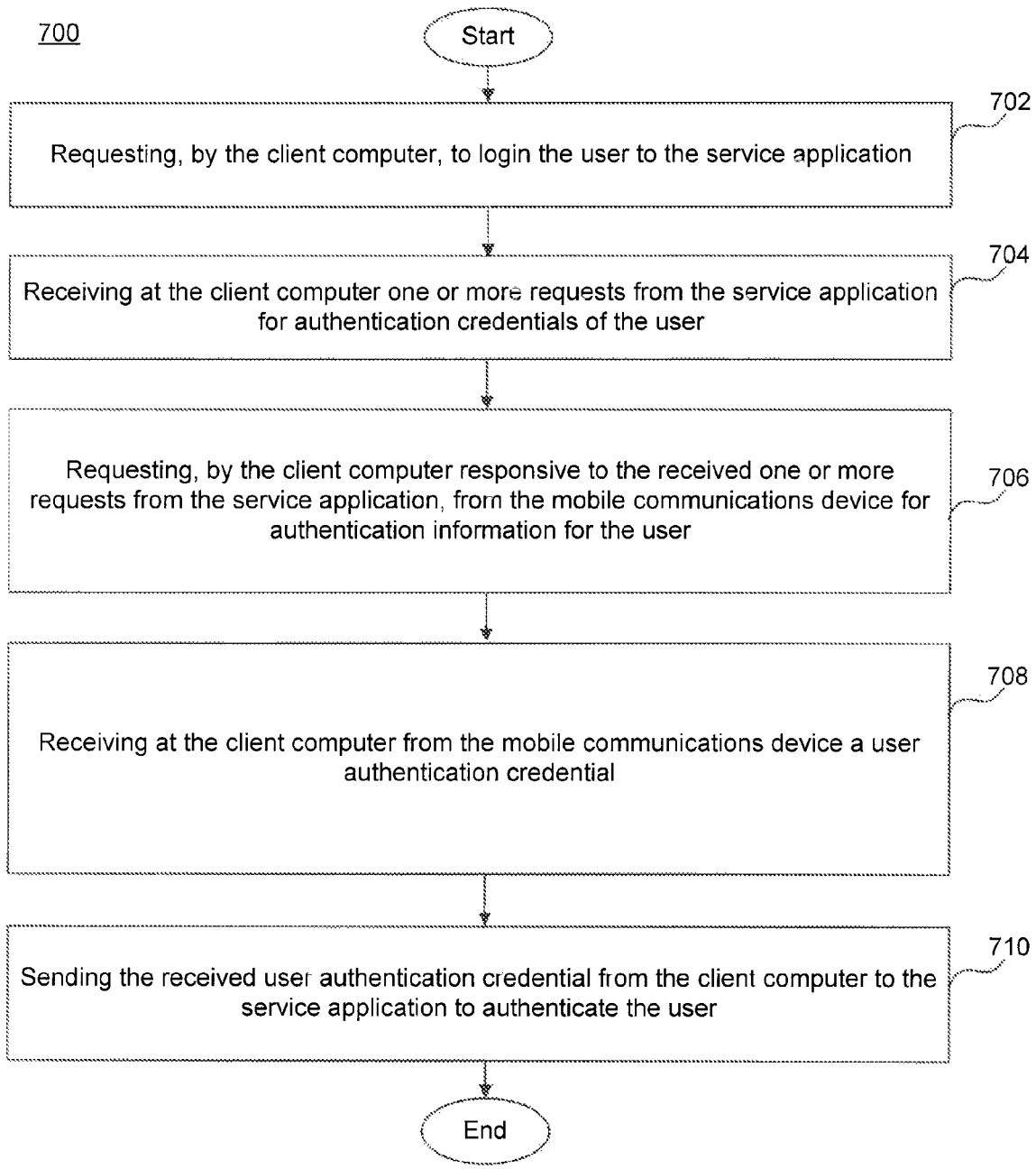
FIG. 7 illustrates a flowchart of a process for performing user security operations.

FIG. 7 illustrates another process 700 that, according to an implementation, may be implemented at client computer 104 to authenticate a user using mobile communications device 106. In step 702, the user invokes a program on the client computer and attempts to login to a web service application such as an online banking application executing at a remotely-located server. The program, for example, a browser generates a message which is transmitted to the server requesting access to the web service application. According to an implementation, the client browser and the web server communicates in a protocol such as, but not limited to, HTTP.

In step 704, the client computer receives one or more requests, from the web server or web service application, for security credentials for the user. For example, the web service application may request a password and a response to a challenge.

In step 706, the client computer, responsive to the request for security credentials from the web service application, requests the mobile communications device to perform one or more security operations using the user's security credentials that are available at the mobile communications device. According to an implementation, upon receiving the request for authentication from the web service application, the client computer may determine whether to directly ask the user for input through the screen and/or keyboard of the client computer, or whether to communicate with a communicatively coupled mobile communications device to obtain the required security credentials for the user. According to another implementation, the user may be prompted to select between providing the credentials at the client computer or through a coupled mobile communications device.

The determination as to whether communication with a coupled mobile communications device is necessary may be based upon configurations at the client computer. For example, if the user has previously used the client computer or has it preconfigured to access web services, then such configuration information may be available in cookies or other configurations stored locally on the client computer. In another implementation, if the user attempts to access an online web service application through a browser configured to the user, for example, by accessing a personalization website, the configuration information as to whether security operations should be requested from a coupled mobile communications device may be made available through the user's browser personalization options.

The message to the mobile communications device requesting the performance of one or more security operations may be formatted based upon a protocol defined between the client computer and mobile communications device for the exchange of messages related to security operations. Based upon the information and/or the operations required, the type and format of the request message may differ. Request messages are described above.

In step 708, the client computer receives one or more responses from the mobile communications device. The received responses are responsive to the request for the mobile communications device to perform one or more security operations. The response messages may correspond to the protocol defined for communicating security operations related messages between the client computer and the mobile communications device. If the request was for the mobile communications device to provide a password, the response would include a password. If the request was for a password and a challenge response, the response would include both. If the request was for the signing and/or encryption of a message, then the response would include the signed and/or encrypted message. A response to a request for signing a message may include only the user's signature or the signature attached to any other data. If the request was for the decryption of a message that is encrypted with the user's public key, then the response would include the decrypted message. If the request is for hashing or attaching a message authentication code to a message then the response is a hashed or authenticated message. If the request is for generating a pseudorandom value then the response is a pseudorandom value. If the request is to generate new credentials signed by old credentials then the response includes a new credential and a signature by an old credential of the public portion of the new credential (while the private portion of the new credential may be kept in the mobile device 106). If the request is to retrieve a "secret value" (other than a password) the response would include that secret value. Such security operations as above are demonstrative, and alternate security services performed by the mobile device 106 are possible and are contemplated within implementations.

In step 710, the client computer responds to the request from the web server or web service application for credentials. According to an implementation, a password and/or challenge response received from the mobile communication device is sent to the web service application. The web service application may then proceed to authenticate the user to access the service.

The implementations have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific implementations will so fully reveal the general nature of the invention that others can, by applying knowledge within the skill of the art, readily modify and/or adapt for various applications such specific implementations, without undue experimentation, without departing from the general concept of the present invention. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described illustrative implementations, but should be defined only in accordance with the following claims and their equivalents.

What is claimed is:

1. A method for performing user security operations using a mobile communications device, comprising:
    storing at least one security credential for a user in the mobile communications device, wherein the storing at least one security credential comprises:
        storing a private key for the user, wherein the private key and a corresponding public key are registered with a certification authority; and
        storing a certificate from the certification authority, wherein the certificate binds the public key to the user;
    receiving at the mobile communications device, a request sent from a client computer to perform an action requiring the at least one security credential stored in the mobile communications device, wherein the request includes information regarding a service application executing in a remote server for which the action is requested, and wherein the request is responsive to an access by the user from the client computer to the service application executing in the remote server through communication between the client computer and the remote server and the communication not being via the mobile communications device;
    determining, by a request validation module of said mobile communications device, a response to the request based upon at least one user configured personal security preference at the mobile communications device; and
    transmitting the determined response to the client computer.

2. The method of claim 1, wherein the determining comprises:
    prompting the user for an authorization to perform the requested action; and
    receiving the authorization from the user.

3. The method of claim 2, wherein the prompting comprises:
    displaying, on a screen of the mobile communications device, information regarding the service application.

4. The method of claim 1, wherein the determining comprises:
    finding an entry corresponding to the service application in a preconfigured personal security preference list in the mobile communications device; and
    generating the response to the request based upon the entry.

5. The method of claim 1, further comprising:
    configuring a personal security preference list in the mobile communications device.

6. The method of claim 5, wherein configuring the personal preference list comprises at least one of:
    configuring entries for one or more respective service applications for which authorization is disallowed; and
    configuring entries for one or more respective service applications for which authorization is allowed.

7. The method of claim 5, wherein configuring the personal preference list comprises:
    configuring one or more entries in the personal security preference list, wherein each of the entries includes a security credential for the user and one or more service applications for which the security credential is authorized.

8. The method of claim 5, wherein configuring the personal preference list comprises:
    configuring one or more rules, wherein respective ones of the one or more rules are configured to be executed in determining the response to the request.

9. The method of claim 1, wherein the requested action comprises a request for an authentication information, and wherein the determined response includes a user security credential from the at least one security credential.

10. The method of claim 1, further comprising:
    requesting, by the client computer, to login the user to the service application;
    receiving at the client computer one or more requests from the service application for authentication information of the user;
    requesting, by the client computer responsive to the received one or more requests from the service application, from the mobile communications device for authentication information for the user;
    receiving at the client computer from the mobile communications device a user security credential; and
    sending the received user security credential from the client computer to the service application to authenticate the user.

11. The method of claim 1, wherein the determining comprises:
    processing the received request at the mobile communications device to identify one or more tasks required to be performed at the mobile communications device;

selecting to perform respective ones of the one or more tasks; and performing selected said respective ones of the one or more tasks.

12. A system for user security operations using a mobile communications device, comprising:
   a mobile communications device including:
      a processor;
      a memory coupled to the processor;
      a communications interface coupled to the processor and configured to communicatively couple the mobile communications device to at least one client computer;
      a credential configuration module configured to be executed by the processor and configured to store at least one security credential for a user in the memory, wherein:
         the at least one security credential comprises a private key;
         the private key and a corresponding public key are from a certification authority; and
         the at least one security credential comprises a certificate that binds the public key to the user;
      a client request receiver configured to be executed by the processor and configured to receive, a request sent from the client computer for the mobile communications device to perform an action requiring the at least one security credential stored in the mobile communications device, wherein the request includes information regarding a service application executing in a remote server for which the action is requested, and wherein the request is responsive to an access by the user from the client computer to the service application executing in the remote server through communication between the client computer and the remote server and the communication not being via the mobile communications device;
      a request validation module configured to be executed by the processor and configured to determine a response to the request based upon at least one user configured personal security preference at the mobile communications device; and
      a client response transmitter configured to be executed by the processor and configured to transmit the determined response to the client computer.

13. The system of claim 12, wherein the client computer comprises:
   a client processor;
   a server communicator configured to be executed by the client processor, and configured to request to login the user to the service application; and
   to receive one or more requests from the service application for security credentials of the user; and
   a mobile device interface module configured to be executed by the client processor, and configured to request, responsive to the received one or more requests from the service application, from the mobile communications device for authentication information for the user, and to receive from the mobile communications device the user security credential.

14. The system of claim 12, wherein the mobile communications device is further configured to:
   receive a request for authentication information for the user; and
   send the stored security credential in response to the received request.

15. The system of claim 12, wherein the service application is configured to:
   receive the security credential from the client computer; and
   authenticate the user using the receive security credential.

16. The system of claim 15, wherein the service application is further configured to:
   execute on a server computer remote from the client computer.

17. A non-transitory computer program product comprising a computer readable storage medium having computer program logic recorded thereon that, when executed by a processor, enables the processor to perform user security operations using a mobile communications device, said non-transitory computer program logic comprising:
   a first logic module configured to store at least one security credential for a user in the mobile communications device wherein:
      the at least one security credential comprises a private key;
      the private key and a corresponding public key are from a certification authority; and
      the at least one security credential comprises a certificate that binds the public key to the user;
   a second logic module configured to receive at the mobile communications device, a request from a client computer to perform an action requiring the at least one security credential stored in the mobile communications device, wherein the request includes information regarding a service application executing in a remote server for which the action is requested, and wherein the request is responsive to an access by the user from the client computer to the service application executing in the remote server through communication between the client computer and the remote server and the communication not being via the mobile communications device;
   a third logic module configured to determine a response to the request based upon at least one user configured personal security preference at the mobile communications device; and
   a fourth logic module configured to transmit the determined response to the client computer.

18. The computer program product of claim 17, wherein the third logic module is further configured to:
   receive a request for authentication information for the user; and
   send the stored security credential in response to the received request.

* * * * *